Oct. 4, 1960    C. A. BROWNELL, JR    2,954,666
METHOD AND APPARATUS FOR PRE-MIXING ROCKET MOTOR FUEL
Filed Aug. 5, 1955    2 Sheets-Sheet 1

Carl A. Brownell, Jr.
INVENTOR.

BY *Clarence A. O'Brien*
*and Harvey B. Jacobson*
Attorneys

Carl A. Brownell, Jr.
INVENTOR.

United States Patent Office 2,954,666
Patented Oct. 4, 1960

2,954,666

METHOD AND APPARATUS FOR PRE-MIXING ROCKET MOTOR FUEL

Carl A. Brownell, Jr., 1206 Blanchard St., Flint, Mich.

Filed Aug. 5, 1955, Ser. No. 526,589

1 Claim. (Cl. 60—35.6)

This invention comprises novel and useful improvements in a method and apparatus for pre-mixing rocket motor fuel, and more specifically comprises a novel and improved method and combustion apparatus for propulsive units and for controlling the flow of a fuel and an oxidizer thereto.

The primary object of this invention is to provide a method and an apparatus for controlling the flow of a fuel and an oxidizer or combustion supporting agent therefor, and which shall be particularly adapted for use with combustion chambers of propulsive units, such as rockets and the like.

A very important object of this invention is to provide a method and apparatus which will permit the use of pre-mixed propellants in the combustion chambers of rockets or the like to assure the maintaining with extreme accuracy of predetermined or ideal mixture ratios at all times and in all portions of the combustion chamber.

A further important object of the invention is to reduce the hazards and dangers heretofore encountered by pre-mixing rocket type fuels and oxidizers therefor prior to the delivery of the pre-mixed mixtures to the combustion chamber of the rocket.

A still further important object of the invention is to provide a method and apparatus which will enable the combustion of the main supply of fuel and oxidizer to be initiated by separately introducing these constituents into the rocket combustion chamber; and will enable the gradual conversion of the system by progressively pre-mixing an increasing proportion of the fuel with the oxidizer for delivery of the pre-mixed fuel and oxidizer to the combustion chamber.

Yet another important object of the invention is to provide a method and apparatus in compliance with the preceding objects which will greatly increase the safety of the method and apparatus by the gradual transfer from the supply of two fluids separately to the combustion chamber to the single supply of premixed fluids thereto; and will reverse this procedure in the sequence of shutting off the fuel and oxidizer supply whereby the feeding of the oxidizer will purge any pre-mixed fuel and oxidizer residue from the passages of the system.

Additional important objects of the invention are to simplify the construction, to facilitate mass production with greater ease, to reduce manufacturing costs, and to provide a more reliable motor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
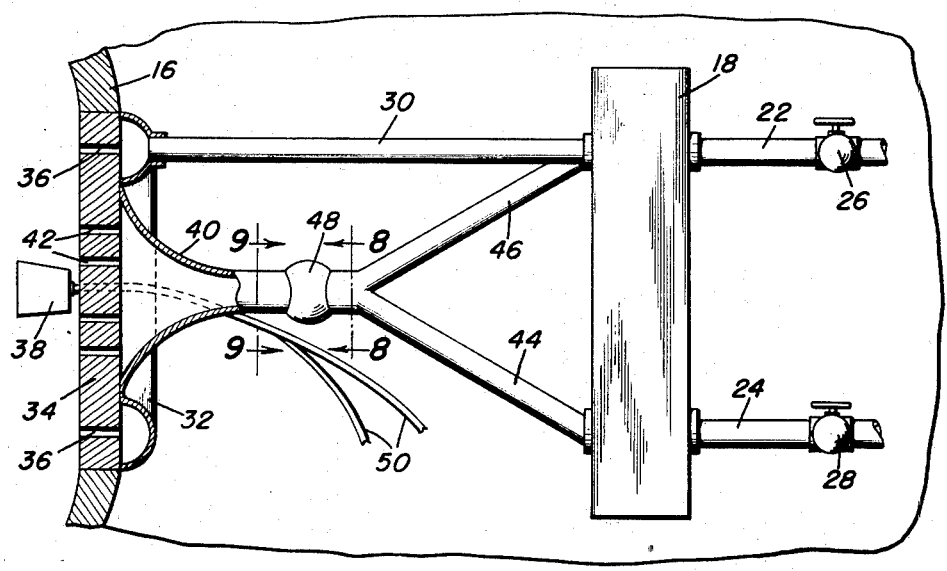
Figure 2 is an enlarged detail view of a portion of Figure 1, and showing partly in elevation and partly in central vertical section the means for supplying a fuel and an oxidizer to a valve assembly and from thence selectively to a mixing chamber and to a pair of manifolds for delivery to the combustion chamber of the apparatus.
Figure 9:
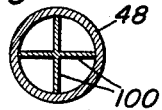
Figure 8:
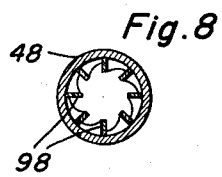
Figure 3:
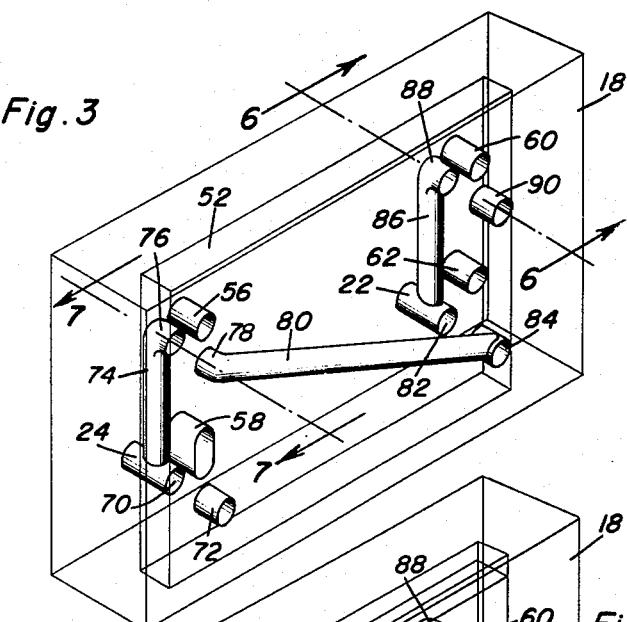
Figures 3, 4 and 5 are diagrammatic views showing in perspective sequential operation of the selector or control valve assembly of the device.
Figure 6:
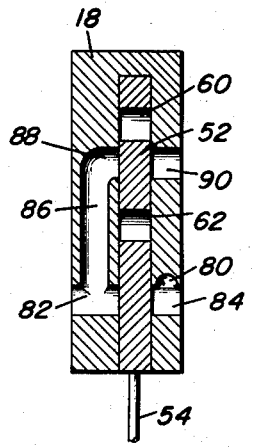
Figure 7:
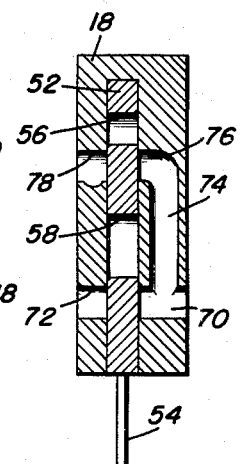

Figures 6 and 7 are detail views taken in vertical transverse section substantially upon the planes indicated by the section lines 6—6 and 7—7 of Figure 3; and Figures 8 and 9 are detail views taken in vertical transverse section substantially upon the planes indicated by the section lines 8—8 and 9—9, respectively, of Figure 2.

Figure 1:
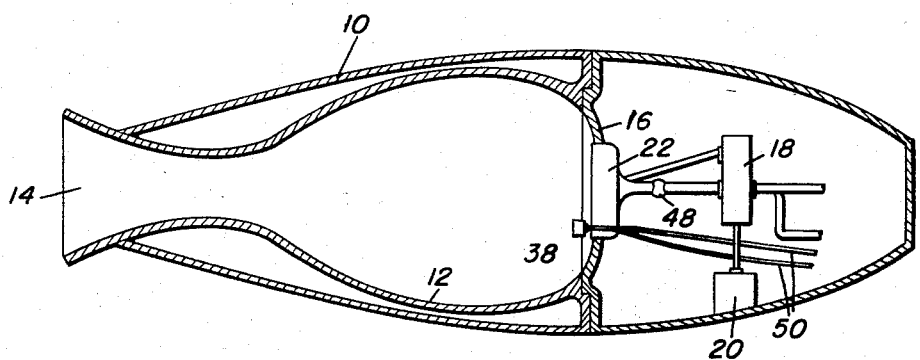
Figure 1 is a somewhat diagrammatic view in vertical central section through a rocket incorporating therein the principles of this invention.

Reference is made first to Figure 1 wherein there is illustrated as an example of the manner in which the principles of this invention may be applied to the combustion chamber of a propulsive unit for a rocket or the like, a generally standard or conventional type of rocket including within its outer casing 10, a combustion chamber 12 having an exhaust or discharge port or orifice 14, the combustion chamber having at its forward end a combustion chamber partition or combustion chamber head 16 together with a valve assembly 18, a valve control member indicated generally by the numeral 20 and being of any desired or conventional construction. There is further provided a manifold assembly 22 by means of which the combustion constituents as controlled by the valve assembly 18 may be delivered into the combustion chamber.

In present day practice, such as shown in the patent to Goddard No. 2,510,572, combustion apparatuses of this general type have the combustion chamber head or partition 16 customarily provided with thousands of minute holes or ports, which are extremely difficult and expensive to produce, and which are necessary in order that innumerable tiny streams of oxidizer and fuel may enter side-by-side across the entire face of the combustion head or injection plate in order to permit mixing within the combustion chamber. Not only are these large numbers of bores expensive to produce, but owing to the unavoidable variations in lengths and sizes of the bores, as well as the effect of their varying positions with respect to the center of the combustion chamber, an uneven combustion inevitably results. By the present invention, the oxidizer and fuel are satisfactorily pre-mixed in any desired and constantly maintained proportion and fed safely into the combustion chamber through a relatively few bores.

Referring now more particularly to Figure 2, it will be observed that the selector valve assembly 18 has a fuel supply conduit 22 and an oxidizer supply conduit 24 connected therewith, under the control of manual valves 26 and 28, respectively. As will be appreciated, the conduits 22 and 24 are supplied with fuel and an oxidizer or combustion supporting fluid from any suitable source, not shown.

It will further be seen that a conduit 30 constituting a fuel supply means directly connects the valve assembly 18 with an annular manifold 32 forming a part of the manifold assembly 22, and which manifold is secured to an injection plate 34 forming a part of the combustion chamber partition or head 16, suitable injection passages 36 extending through this plate for discharging fuel from the manifold 32 into the combustion chamber. Disposed centrally of the injection plate or in any other convenient place within the combustion chamber is a rocket motor starter 38 of any conventional construction whereby combustion may be initiated in the combustion chamber.

The manifold assembly 22 also includes a central manifold 40 which, if desired, may be integral with the annular manifold 32 and disposed therewithin, this central manifold communicating with the central portion of the injector plate 34, as by means of a plurality of injection ports or passages 42. It will thus be seen that the fuel supplied from the supply pipe 30 to the annular manifold 32 is injected into the combustion chamber in a ring which surrounds the injection of the oxidizer or of the pre-mixed fuel and oxidizer supplied by the central manifold 40.

A pair of inlet conduits or passages 44 and 46 also communicate with the valve assembly 18 and converge and communicate with a mixing chamber 48 which, in turn, discharges into the central manifold 40.

Also shown in Figures 1 and 2 are a pair of conduits 50 by means of which a starting fuel and a starting oxidizer of any desired type may be supplied directly to starter motor 38 and thence into the combustion chamber for initiating combustion. Since the starting system may be of a conventional and known design, further description of the same is deemed to be unnecessary, as forming no part of the present invention.

Figure 4:
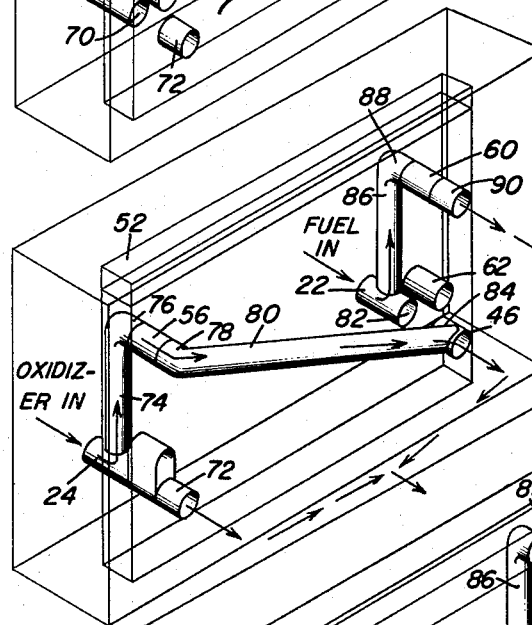
Figure 5:
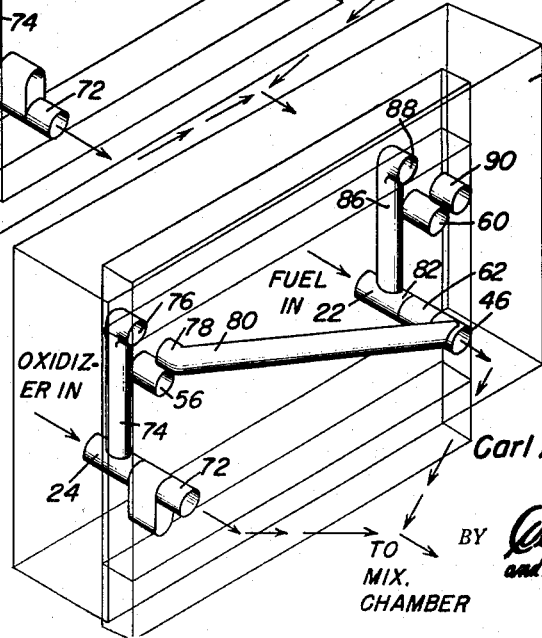

Referring next to the diagrammatic views of Figures 3-5, it will be seen that the valve assembly 18 comprises a casing in which is mounted for limited vertical sliding movement a valve plate 52. As shown more clearly in Figures 6 and 7, this plate is provided with valve actuating rods 54 by means of which the valve may be raised or lowered under the control of the valve actuating member 20 which may be of any desired type and whose construction in itself forms no part of the invention claimed herein.

It will be observed by a comparison of Figures 3-7 that the valve plate 52 has two pairs of ports therein, one pair comprising an upper transverse port 56 and a lower transverse port 58 which constitute oxidizer ports, and a pair of fuel ports comprising an upper transverse port 60 and a lower transverse port 62. It will be observed that all these ports are of the same size except the port 58 which is vertically elongated for a purpose which will become subsequently apparent. Cooperating with these two pairs of ports in the valve plate 52 are a plurality of ports in the body of the casing of the valve. Thus, the oxidizer inlet passage 24 communicates with an oxidizer inlet port 70 which is aligned with the port 72 with which the conduit 44 is connected, the slide valve 52 being interposed between these two ports, as shown in Figure 7. The port 70 is also connected by a by-pass or branch conduit 74 with an upwardly positioned port 76 which also is in alignment with a port 78, this latter port being in communication with a transfer passage 80. As will now be apparent from a comparison of Figure 7 with Figures 3-5, the pair of oxidizer ports 56 and 58 in the valve body are operatively associated with and movable between the upper and lower pair of oxidizer ports 70, 72 and 76, 78 in a particularly timed relation as set forth hereinafter.

It will also be seen that the casing is provided with a plurality of ports which cooperate with the pair of fuel ports 60 and 62. Thus, the fuel supply conduit 22 communicates with the port 82 which is aligned with a port 84 and with which the lower end of the transfer conduit or passage 80 also communicates. The port 82 also is provided with a by-pass or branch conduit 86 whose upper end communicates with a port 88 registering with the port 90.

The pair of fuel ports 60 and 62 of the sliding valve are disposed between and cooperate with the plurality of ports 82, 84 and 88, 90 in a manner to be now described.

Referring first to the position shown in Figure 3, it will be seen that the slide valve is in such a position that the ports 56, 58, 60 and 62 of the slide valve are out of communication with any of the ports of the valve assembly. In this position, therefore, which is also shown in Figures 6 and 7, the supply of the main fuel and oxidizer for the combustion is cut off. When it is desired to start the apparatus, the valve assembly 18 being in the position shown in Figures 3, 6 and 7, a starting fuel and a starting oxidizer are supplied in any desired manner, from any suitable source by the supply conduits 50 into the starter device 38 and are ignited therein in a conventional manner. When the combustion chamber has warmed up sufficiently by the combustion products of the starter 38, the actuator 20 is caused to move the slide valve 52 downwardly from the position shown in Figure 3. As this valve moves downwardly, the oxidizer inlet ports 56 and 58 of the valve begin to simultaneously register with the ports 76 and 70 and therefore with the ports 78 and 72. Oxidizer is thereupon supplied by means of 24, 70, 72 and 44 to the mixer 48; and by means of 74, 76, 56, 78 and 80 is delivered to 84. Slightly thereafter, the fuel port 60 of the valve begins to register with the ports 88, 90, so that the oxidizer will have a slight lead and will reach the combustion chamber first. Subsequently, fuel begins to flow from the conduit 22, through the ports and passages 82, 86, 88, 60 and 90 to the fuel supply conduit 30 connected to the latter and from thence to the annular manifold 32 and directly into the combustion chamber 12. At the same time, the oxidizer flows from the conduit 24 through the ports and valves 70, 58 and 72 to the passage 44 and simultaneously by means of the ports and passages 70, 74, 76, 56 and 78, to the by-pass passage 80 and from thence to the port 84 and to the passage 46. The oxidizer thus flows by the two passages 44 and 46 to the mixing device 48 and from thence into the central manifold 40 to be discharged into the combustion chamber. At this time, the main fuel and the main oxidizer are fed separately into the combustion chamber and are ignited by the continuing combustion of the starting motor 38. At this point, the combustion of the main fuel and oxidizer of the apparatus is initiated. As the slide valve continues to move downwardly, from the position of Figure 3, the position of Figure 4 is reached. At this time, the oxidizer ports of the valve assembly are in complete registry so that the oxidizer is fed, as shown by the arrows in Figure 4, partly directly through the passage 44 and the remainder by means of the by-pass 80 through the passage 46. At the same time, the fuel ports are in complete registry so that fuel is supplied at full rate of flow through the supply conduit 30. Thus, both fuel and oxider are supplied at full quantity, as determined by the throttling valves 26 and 28, and at the proper proportion as determined by those valves for maintaining continuous combustion in the combustion chamber at a predetermined rate and at a constant proportion of the fuel to the oxidizer.

As the slide valve continues to move downwardly under the operation of the control device 20, the valve assembly moves from the position of Figure 4 toward the position of Figure 5. During the beginning of this movement, the ports 56 and 60 begin to move out of registration with the ports 76 and 78 and 88 and 90, and as the port 60 moves out of registration with its aligned ports 88 and 90, the port 62 moves into registration with its aligned ports 82 and 84. Consequently, the flow of fuel continues uninterruptedly into the valve assembly, but it is gradually and proportionately cut off from the fuel supply means 30 by the closing of the port 60 from the ports 88 and 90, and the gradual opening of the port 62 into communication with the ports 82 and 84. Consequently, as the oxidizer is being cut off from the transfer conduit 80, the flow of fuel is being transferred from the line 30 to the passage 46 through the gradual registration of the port 62 with the ports 82 and 84. During this part of the operation, it will be observed that the flow of oxidizer by way of the transfer passage 80 to the passage 46 is gradually ceasing while the supply of fuel thereto is increasing in the same proportion. Eventually, when the position of Figure 5 is reached, all of the supply of oxidizer is flowing through the passage 44 while all the supply of fuel is flowing through the passage 46, the conduit 80 now standing idle as do the branch conduits 74 and 86.

The fuel and oxidizer supplied by the passages 44 and 46 are now delivered to and mixed in the mixing chamber 48. As shown in Figure 8, the junction of the passage 44 and 46 may be provided with a plurality of spiral fins or baffles 98, which serve to thoroughly pre-mix, together with the mixing chamber 48, the main fuel and the main oxidizer. After such mixing, the mixture, as shown in Figure 9, passes through fins or vanes 100 disposed between the mixing chamber 48 and the central manifold 40 for stopping or preventing turbulence or whirling of the premixed combustible mixture.

In the position shown in Figure 5, the apparatus is in normal operation with pre-mixed fuel and oxidizer being supplied in controlled proportions to the combustion chamber.

When it is desired to shut off the combustion apparatus, the slide valve is moved upwardly by the control device 20 and the reverse operation ensues. It will be noted in this reverse operation, beginning with the combustion of a pre-mixed charge, the pre-mixed charge is changed by gradually diverting a portion of the fuel from the mixing chamber into the fuel supply line 30 until all of the fuel is supplied directly to the annular manifold 32 by the line 30, while the oxidizer is supplied to the central manifold 40. Thereafter, the fuel supply is cut off, and as the valve moves upward, a portion of the oxidizer is diverted through the transfer or branch passage 80 into the passage 46 for purging the latter of any residue of fuel. Finally, the oxidizer supply itself is cut off, the parts now being in the position shown in Figure 3.

It will be noted that although the initiation of the combustion of the main components of the charge are effected by introducing the fuel from the annular manifold and the oxidizer from the central manifold, so that a relatively poor mixing of the same is obtained within the combustion chamber, that after the conversion of the fuel feeding into the mixing device, that a homogeneous mixture of uniform and constant fuel and oxidizer proportion is thereafter supplied to the combustion chamber. Moreover, the premixing of the fuel and its oxidizer are so effected as to substantially eliminate the hazard of explosion of the same in the supply system of the engine. Finally, as the combustion is shut off, this system automatically purges itself of any pre-mixed propellants which might constitute an explosion hazard.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A combustion apparatus for propulsive units comprising mixing and combustion chambers, means establishing continuous communication from the mixing chamber to the combustion chamber, means for supplying an oxidizer to said mixing chamber for delivery to said combustion chamber and means for supplying fuel to said combustion chamber for initiating combustion therein with said oxidizer, means for transferring the flow of fuel from said fuel supply means to said mixing chamber for premixing the fuel and oxidizer therein whereby pre-mixed fuel and oxidizer will be delivered from said mixing chamber to said combustion chamber for maintaining combustion of said fuel and oxidizer therein, a pair of inlet passages communicating with said mixing chamber, said oxidizer supply means and said transfer means each communicating with one of said inlet passages, mixing baffles operatively interposed between said pair of passages and said mixing chamber, vanes in said communication establishing means preventing swirling of the fluid passing therethrough.

References Cited in the file of this patent
UNITED STATES PATENTS

| | | |
|---|---|---|
| 1,145,389 | Schneider | July 6, 1915 |
| 1,800,616 | Forster | Apr. 14, 1931 |
| 1,879,186 | Goddard | Sept. 27, 1932 |
| 2,216,846 | Lewis | Oct. 8, 1940 |
| 2,395,403 | Goddard | Feb. 26, 1946 |
| 2,500,334 | Zucrow | Mar. 14, 1950 |
| 2,510,572 | Goddard | June 6, 1950 |
| 2,540,666 | Goddard | Feb. 6, 1951 |
| 2,551,112 | Goddard | May 1, 1951 |
| 2,555,082 | Goddard | May 29, 1951 |
| 2,598,787 | Haak | June 3, 1952 |
| 2,689,454 | Schneider | Sept. 21, 1954 |
| 2,738,648 | Ogle | Mar. 20, 1956 |
| 2,751,844 | Bixby | June 26, 1956 |
| 2,761,282 | Allen | Sept. 4, 1956 |
| 2,782,801 | Ludurg | Feb. 26, 1957 |